(12) United States Patent
Chen

(10) Patent No.: US 9,909,619 B2
(45) Date of Patent: Mar. 6, 2018

(54) FREE-FLOATING SHAFT FOR GAS TURBINE ENGINES

(71) Applicant: DYC Turbines, LLC, San Diego, CA (US)

(72) Inventor: Daih-Yeou Chen, San Diego, CA (US)

(73) Assignee: DYC TURBINES, LLC, San Diego, CA (US)

( * ) Notice: Subject to any disclaimer, the term of this patent is extended or adjusted under 35 U.S.C. 154(b) by 302 days.

(21) Appl. No.: 14/741,103

(22) Filed: Jun. 16, 2015

(65) Prior Publication Data

US 2016/0369842 A1 Dec. 22, 2016

(51) Int. Cl.
*F16C 21/00* (2006.01)
*F16C 32/06* (2006.01)
*F16C 37/00* (2006.01)

(52) U.S. Cl.
CPC .......... *F16C 21/00* (2013.01); *F16C 32/0625* (2013.01); *F16C 37/007* (2013.01); *F16C 2360/23* (2013.01)

(58) Field of Classification Search
CPC ...... F16C 21/00; F16C 32/06; F16C 32/0607; F16C 32/0614; F16C 32/0666; F01D 25/16; F01D 25/162; F04D 29/0513

USPC ................ 384/101, 109, 114, 126, 131, 134, 384/282–285, 490, 609
See application file for complete search history.

(56) References Cited

U.S. PATENT DOCUMENTS 5,102,305 A * 4/1992 Bescoby ................... F01D 5/02
416/241 B
7,926,291 B1 * 4/2011 Wilson, Jr. ............. F01D 5/026
415/111

\* cited by examiner

*Primary Examiner* — Kenneth Bomberg
*Assistant Examiner* — Hoon Choi
(74) *Attorney, Agent, or Firm* — Steven R. Vosen

(57) ABSTRACT

A hybrid bearing system for gas turbine engines is disclosed. The hybrid bearing system comprises ball/roller bearings and air bearings. For horizontal applications, compressed air injected into the air bearing provides a lift force such that enables the rotating shaft for the turbine to float freely. The compressed air is also employed to cool the ball/roller bearings. Hence, given the reduced friction on the ball/roller bearings due to the free-floating shaft, as well as the air cooling of the ball/roller bearings, typical lubrication systems are not necessary. For vertical applications, the compressed air provides cooling to the ball/roller bearings which renders the need for conventional lubrication systems unnecessary.

18 Claims, 7 Drawing Sheets

FREE-FLOATING SHAFT FOR GAS TURBINE ENGINES

BACKGROUND OF THE INVENTION

1. Field of the Invention

The present invention relates in general to gas turbine engines. More particularly, the invention is directed to gas turbines employing air bearings.

2. Description of the Related Art

Gas turbine engines typically employ ball/roller bearings to provide support for and to limit both the radial and axial excursions of the rotating shaft. Conventional engines may require complex lubrication systems to lubricate and cool the bearings during operation. Such lubrication systems may increase the size and cost of gas turbine engines.

Accordingly, a need exists to improve bearings for gas turbine engines.

SUMMARY OF THE INVENTION

In the first aspect, a bearing system is disclosed. The bearing system comprises a shaft centered around a generally horizontal centerline, a compressor coupled to the shaft, the compressor supplying compressed air, and an annular sleeve radially surrounding the shaft, the sleeve having a first and a second set of channels formed on the inner surface of the sleeve, each channel forming an air passageway between the sleeve and the shaft, the first set of channels formed in the generally upper portion of the sleeve, the second set of channels formed in the generally lower portion of the sleeve, the first and second set of channels receiving compressed air from the compressor. The first and second set of channels are configured to generate a lifting force on the shaft in a generally upward direction.

In a first preferred embodiment, each of the first set of channels has a first cross sectional area, and each of the second set of channels has a second cross sectional area, where the first cross sectional area is less than the second cross sectional area. Each of the first and second set of channels preferably further comprise a down-stream metering slot, wherein the metering slot is configured to regulate the rate of airflow in the first and second set of channels. The ball bearings are preferably configured for providing support for the shaft. The ball bearings are preferably configured to receive the compressed air for cooling the ball bearings. The system preferably does not employ a lubrication system for the ball bearings. The bearing system preferably further comprises a thrust management cavity receiving the compressed air from the compressor and providing the compressed air to the first and second set of channels in the sleeve, wherein the thrust management cavities are configured to reduce thrust load based on cavity air pressure and shaft-end surface area.

The bearing system preferably further comprises a second compressor coupled to the opposite end of the rotating shaft, the second compressor supplying a second source of compressed air, and a second annular sleeve radially surrounding the shaft, the second sleeve having a third and a fourth set of channels formed on the inner surface of the sleeve, each channel forming an air passageway between the second sleeve and the shaft, the third set of channels formed in the generally upper portion of the second sleeve, the fourth set of channels formed in the generally lower portion of the sleeve, the third and fourth set of channels receiving the second source of compressed air from the second compressor. The airflow through the first and second channels is preferably in a direction opposite to that of the third and fourth channels.

The bearing system preferably further comprises a second compressor coupled to the opposite end of the rotating shaft, the second compressor supplying a second source of compressed air, and a second annular sleeve radially surrounding the shaft, the second sleeve having a third and a fourth set of channels formed on the inner surface of the sleeve, each channel forming an air passageway between the second sleeve and the shaft, the third set of channels formed in the generally upper portion of the second sleeve, the fourth set of channels formed in the generally lower portion of the sleeve, the third and fourth set of channels receiving the second source of compressed air from the second compressor. The airflow through the first and second channels is preferably in the same direction as that of the third and fourth channels.

In a second aspect, a bearing system is disclosed. The bearing system comprises a shaft centered around a generally vertical centerline, a compressor coupled to the shaft, the compressor supplying compressed air, and an annular sleeve radially surrounding the shaft, the sleeve having channels formed on the inner surface of the sleeve, each channel forming an air passageway between the sleeve and the shaft, the channels receiving compressed air from the compressor.

In the second preferred embodiment, each of the channels further comprise a down-stream metering slot, wherein the metering slot is configured to regulate the rate of airflow in the channels. The bearing system preferably further comprises one or more ball bearings coupled to the shaft, wherein the ball bearings are configured for providing support for the shaft. The ball bearings are preferably configured to receive the compressed air for cooling the ball bearings. The system preferably does not employ a lubrication system for the ball bearings. The bearing system preferably further comprises a thrust management cavity receiving the compressed air from the compressor and providing the compressed air to the channels in the sleeve, wherein the thrust management cavities are configured to reduce thrust load based on cavity air pressure and shaft-end surface area. The bearing system preferably further comprises a second compressor coupled to the opposite end of the rotating shaft, the second compressor supplying a second source of compressed air, and a second annular sleeve radially surrounding the shaft, the second sleeve having a second set of channels formed on the inner surface of the sleeve, each channel forming an air passageway between the second sleeve and the shaft, the second set of channels receiving the second source of compressed air from the second compressor. The airflow through the first set of channels is preferably in the same direction as that of the second channels.

In a third aspect, a bearing system is disclosed. The bearing system comprises a shaft centered around a generally horizontal centerline, a first hybrid bearing system comprising a compressor coupled to the shaft, the compressor supplying compressed air, an annular sleeve radially surrounding the shaft, the sleeve having a first and a second set of channels formed on the inner surface of the sleeve, each channel forming an air passageway between the sleeve and the shaft, the first set of channels formed in the generally upper portion of the sleeve, the second set of channels formed in the generally lower portion of the sleeve, the first and second set of channels receiving compressed air from the compressor, and a first set of one or more ball bearings coupled to the shaft, wherein the ball bearings are configured to provide support for the shaft. The first and second set of channels are configured to generate a lifting force on the shaft in a generally upward direction. The bearing system further comprises a second hybrid system comprising a second compressor coupled to the opposite end of the rotating shaft, the second compressor supplying a second source of compressed air, a second annular sleeve radially surrounding the shaft, the second sleeve having a third and a fourth set of channels formed on the inner surface of the sleeve, each channel forming an air passageway between the second sleeve and the shaft, the third set of channels formed in the generally upper portion of the second sleeve, the fourth set of channels formed in the generally lower portion of the sleeve, the third and fourth set of channels receiving the second source of compressed air from the second compressor, a second set of one or more ball bearings coupled to the shaft, wherein the ball bearings are configured to provide support for the shaft, an engine compressor, and a turbine.

In a third preferred embodiment, the compressor is optional if the compressed air are supplied by an engine compressor. The airflow through the first and second channels is preferably in a direction opposite to that of the third and fourth channels. The airflow through the first and second channels is preferably in the same direction as that of the third and fourth channels.

These and other features and advantages of the invention will become more apparent with a description of preferred embodiments in reference to the associated drawings.

DETAILED DESCRIPTION OF THE PREFERRED EMBODIMENTS

A free-floating shaft for gas turbine engines is disclosed that is capable of producing air pressure differential to reduce thrust and provide lift for weightless rotor rotation during high speed operations. The free-floating shaft also provides air cooling to remove heat generated from ball/roller bearings without using lubricants. The free-floating shaft system is comprised of a rotor shaft, ball/roller bearings, air bearings, compressors, and cavities for thrust load reduction.

Ball/roller bearings are used extensively in high power density gas turbine engines to provide support for the rotating shaft and limit both radial and axial excursions of the rotor shaft to avoid rubbing. The ball/roller bearings are also designed to take both radial and thrust loads during high speed operation. High speed operation causes heat generation in the bearings and lubrication is normally used to dissipate heat. Adequate lubrication of ball/roller bearings is also required to prevent the rolling element surfaces from touching the inner and outer ring raceways. The use of lubricants in the ball/roller bearings involves a complicated lubrication system, which includes storage, pumping, filtering, circulation, atomization, and cooling. The lubricant sealing or retention in the bearings and housings is also very problematic.

In order to eliminate the use of lubricant and the associated lubrication system without sacrificing ball/roller bearings performance, the free-floating shaft incorporates a new air bearing to reduce thrust load and provide lift for weightless rotor rotation during high speed ball/roller bearing operations.

Inlet air for air bearings in the free-floating shaft system are pressurized using compressors and enters cavities located at shaft ends. The use of compressors is optional if pressurized air from engine compressors is available for cavity pressurization. These cavities are designed to reduce thrust load based on the cavity air pressure and shaft-end surface area. The cavity air then flows through the air passageways formed by the rotor shaft and an air-circuit sleeve. Each air passageway has a metering slot at the end of the air-circuit sleeve to regulate airflow rate. Therefore, both the gap and the airflow rate of air passageways can be adjusted to create air pressure differential to lift the rotating shaft. The length of the air-circuit sleeve is determined based on lift surface area needed for weightless rotor rotation, which leads to no metal contact between the rolling element and raceways even without using lubricants and the complicated lubrication system. The air exiting the metering slots is also used to remove heat generated in the ball/roller bearings.

Figure 1:
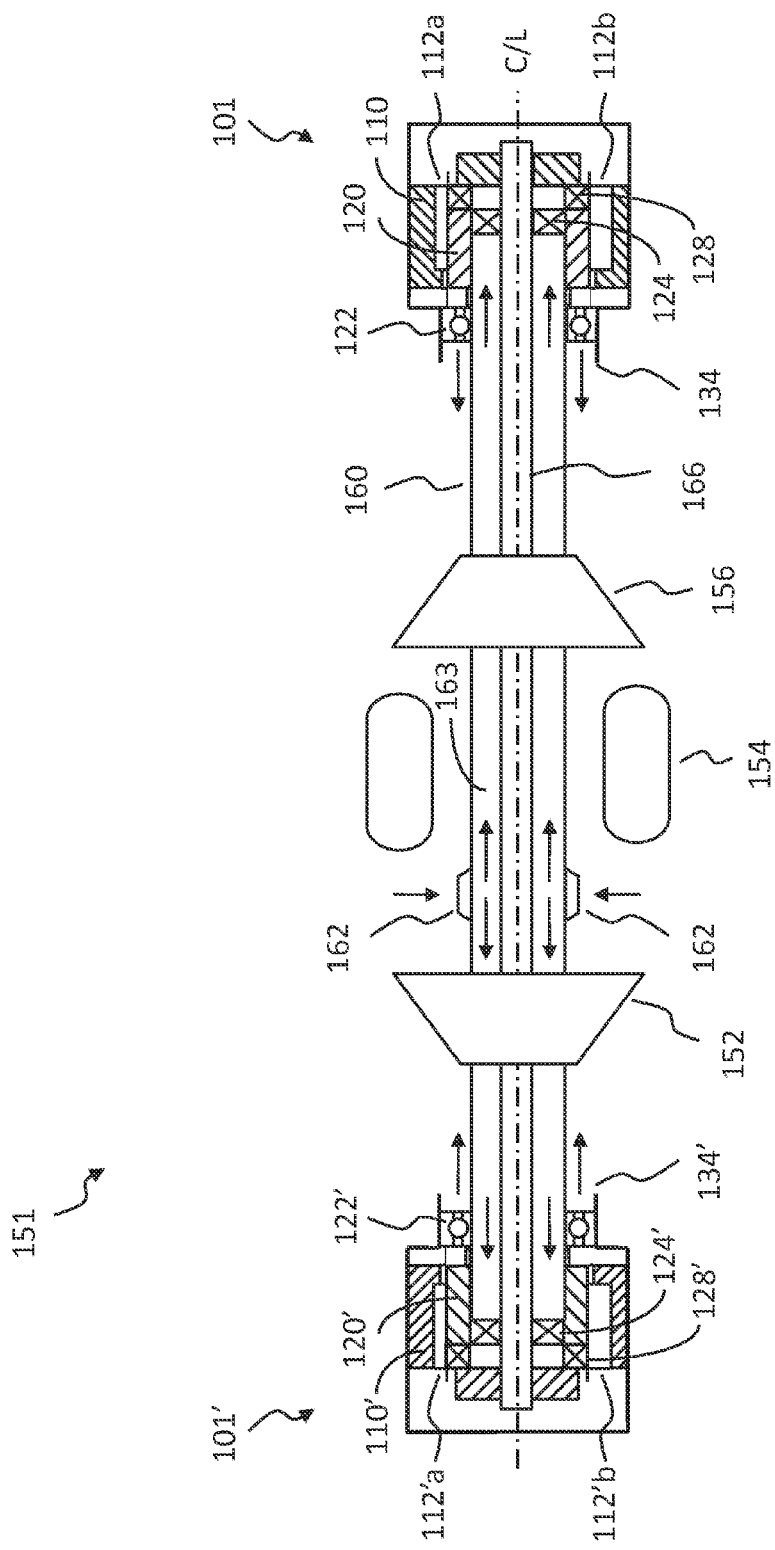
FIG. 1 is a schematic diagram of a horizontal turbine engine having an air bearing system in an embodiment.

FIG. 1 is a schematic diagram of a horizontal turbine engine 151 having hybrid bearing systems 101 and 101' in an embodiment. The turbine engine 151 comprises a first hybrid bearing system 101, a second hybrid bearing system 101', an engine compressor 152, a combustor 154, and a turbine 156. The turbine engine 151 has a rotating shaft centered around a generally horizontal centerline. The rotating shaft comprises a hollow free-floating shaft 160 and an inner rotor shaft 166 in one or more embodiments. The free-floating shaft 160 and the rotor shaft 166 rotate around a center line $C_L$ and connects the first hybrid bearing system 101, the turbine 156, the engine compressor 152, and the second hybrid bearing system 101'.

Figure 2:
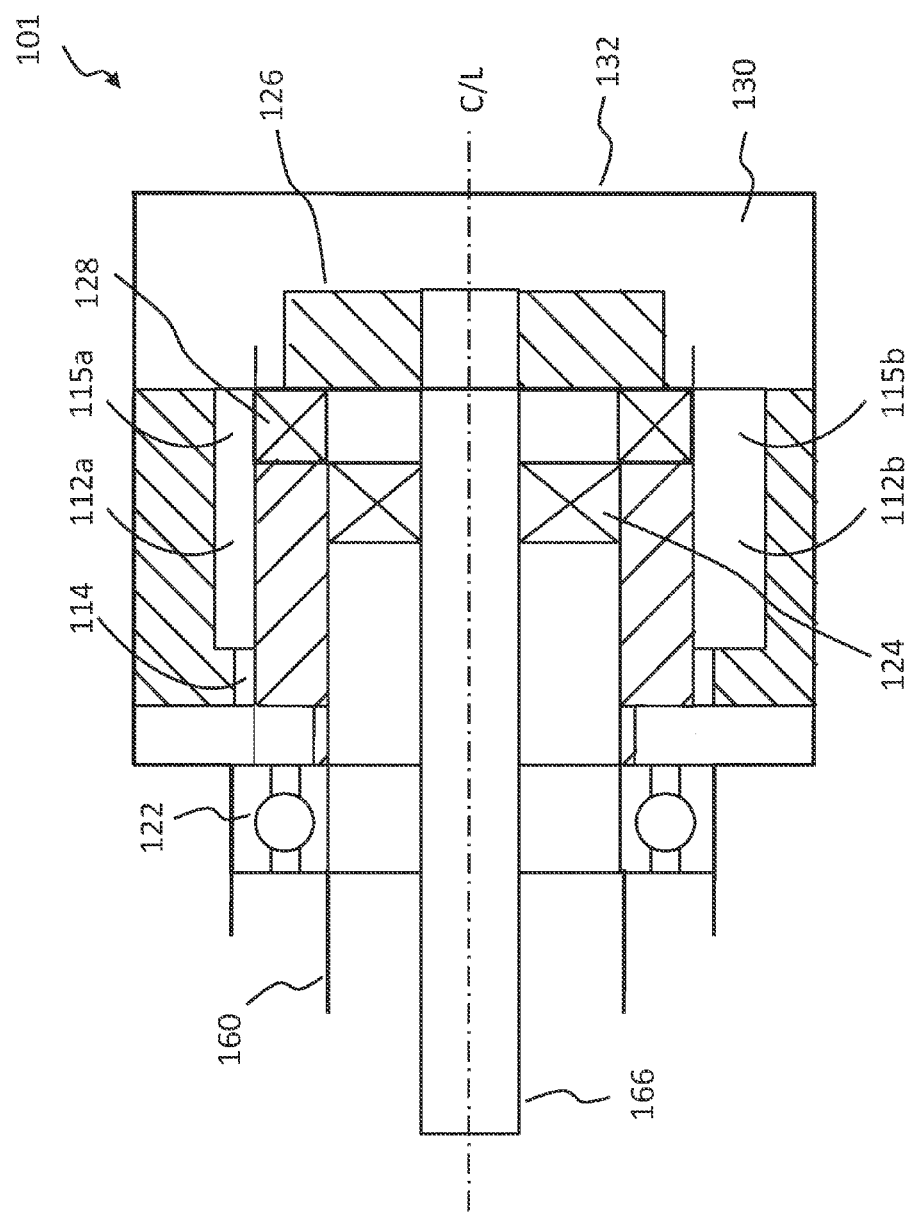
FIG. 2 is a schematic diagram of a hybrid bearing system having an air bearing and a ball/roller bearing.
Figure 3:
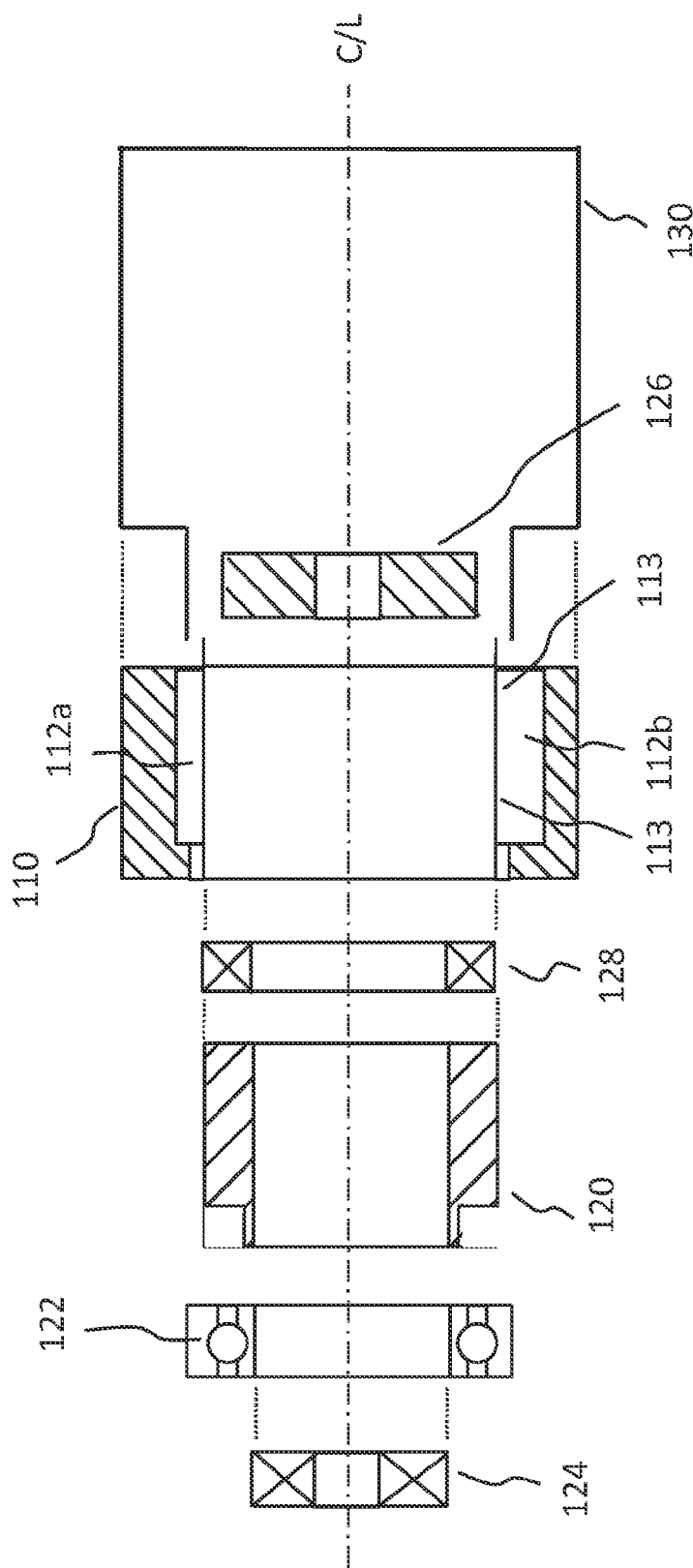
FIG. 3 is an exploded view of the hybrid bearing system.
Figures 4, 5:
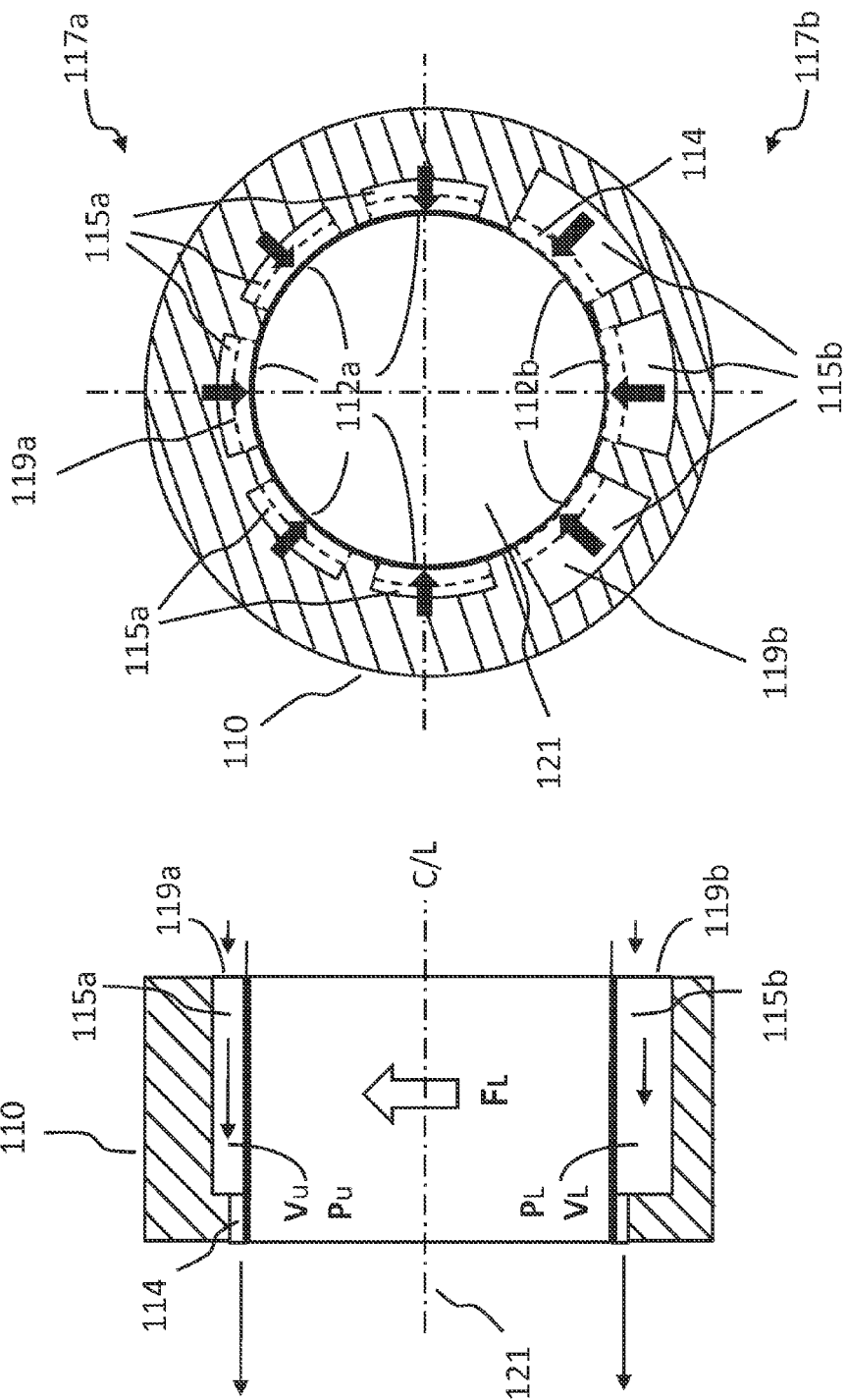
FIG. 4 is a side view of a representation of the air circuit sleeve and the lift cylinder showing the air passageways.
FIG. 5 is a front view of a representation of the air circuit sleeve and the lift cylinder showing the air passageways.

Referring to FIGS. 1-3, the first hybrid bearing system 101 comprises a compressor, such as axial compressor 124 and radial compressor 128, coupled to the rotor shaft 166 or the floating shaft 160 where the compressors 124 and 128 supply compressed air. In an embodiment, a lift cylinder 120 may be placed around the free floating shaft 160. The first hybrid bearing 101 also has an annular air-circuit sleeve 110 radially surrounding the lift cylinder 120 and the free-floating shaft 160. In one or more embodiments, a tie-shaft nut 126 may be secured to rotor shaft 166 and may be used to secure radial compressor 128 to the lift cylinder 120. The sleeve 110 has a first set of channels 112a and a second set of channels 112b formed on the inner surface 113 of the sleeve 110. Each channel 112a and 112b forms an air passageway 115a and 115b respectively between the sleeve 110 and the lift cylinder 120 and free-floating shaft 160. As shown in FIG. 5 and described below, the first set of channels 112a are formed in the generally upper portion 117a of the sleeve 110, and the second set of channels 112b are formed in the generally lower portion 117b of the sleeve 110. The first and second set of channels 112a and 112b receive compressed air from the compressors 124 and 128.

The hybrid system 101 also comprises down-stream metering slots 114, wherein the metering slot 114 is configured to regulate the rate of airflow in the first and second set of channels 112a and 112b.

The first hybrid bearing also has a first set of one or more ball bearings 122 coupled to the free floating shaft 160, wherein the ball bearings 122 are configured to provide support for the free floating shaft 160. As described below, the first and second set of channels 112a and 112b are configured to generate a lifting force on the free floating shaft 160 and the rotor shaft 166 in a generally upward direction.

In one or more embodiments, each of the first set of channels 112a has a first cross sectional area 119a, and each of the second set of channels 112b has a second cross sectional area 119b, where the first cross sectional area 119a is less than the second cross sectional area 119b.

Likewise, as illustrated in FIG. 1, the second hybrid bearing system 101' comprises a compressor, such as axial compressor 124' and radial compressor 128', coupled to the rotor shaft 166 or the floating shaft 160 where the compressors 124' and 128' supply compressed air. In an embodiment, a lift cylinder 120' may be placed around the free floating shaft 160. The second hybrid bearing 101' also has an annular air-circuit sleeve 110' radially surrounding the lift cylinder 120' and the free-floating shaft 160. The sleeve 110' has a third set of channels 112'a and a fourth set of channels 112'b formed on the inner surface 113' of the sleeve 110'. Each channel 112'a and 112'b forms an air passageway 115'a and 115'b respectively between the sleeve 110' and the lift cylinder 120' and free-floating shaft 160. As shown in FIG. 5 and described below, the third set of channels 112'a are formed in the generally upper portion 117a of the sleeve 110, and the fourth set of channels 112'b are formed in the generally lower portion 117b of the sleeve 110. The third and fourth set of channels 112'a and 112'b receive compressed air from the compressors 124' and 128'. The hybrid system 101' also comprises down-stream metering slots 114', wherein the metering slot 114' is configured to regulate the rate of airflow in the first and second set of channels 112'a and 112'b.

The second hybrid bearing 101' also has a second set of one or more ball bearings 122' coupled to the free floating shaft 160, wherein the ball bearings 122' are configured to provide support for the free floating shaft 160. As described below, the third and fourth set of channels 112'a and 112'b are configured to generate a lifting force on the free floating shaft 160 and the rotor shaft 166 in a generally upward direction.

In one or more embodiments, each of the first set of channels 112'a has a first cross sectional area 119'a, and each of the second set of channels 112'b has a second cross sectional area 119'b, where the first cross sectional area 119'a is less than the second cross sectional area 119'b.

While embodiments discussed herein describe sleeves with two sets of channels or air passageways, it shall be understood that this is for illustration purposes only and that any number of sets of channels and air passageways are contemplated in one or more embodiments.

Outside air enters the free-floating shaft 160 at air inlets 162. As the free-floating shaft 160 is hollow, a cavity 163 is formed between the free-floating shaft 160 and the rotor shaft 166. Air enters into the cavity 163, a portion of the air traverses to hybrid bearing system 101 and another portion of air traverses to hybrid system 101'.

For hybrid system 101, the air enters the axial compressor 124, is then injected into radial compressor 128 and enters a thrust management cavity 130. As seen in FIG. 2, the thrust management cavity 130 is formed between the housing 132 and the other components of the hybrid system 101 including the tie-shaft nut 126, the lift cylinder 120, and the air-circuit sleeve 110. The thrust management cavity 130 receives the compressed air from the compressors 124 and 128 and provides the compressed air to the first and second set of channels 112a and 112b in the sleeve 110, where the thrust management cavity 130 is configured to reduce thrust load based on cavity air pressure and shaft-end surface area. Compressed air then flows though air passageways 115a and 115b, and then flows to ball bearings 122. The ball bearings 122 are configured to receive the compressed air for cooling the ball bearings 122. In one or more embodiments, the turbine engine 151 does not employ a lubrication system for the ball bearings 122. The airflow from the hybrid system 101 exits from air exit 134 which is directed back toward the turbine 156. The exiting air will either re-enter the turbine engine or discharge into the atmosphere.

For hybrid system 101', the air enters the axial compressor 124', is then injected into radial compressor 128' and enters a thrust management cavity 130'. The thrust management cavity 130' receives the compressed air from the compressors 124' and 128' and provides the compressed air to the third and fourth channels 112'a and 112'b in the sleeve 110', where the thrust management cavity 130' is configured to reduce thrust load based on cavity air pressure and shaft-end surface area. Compressed air then flows though air passageways 115'a and 115'b, and then flows to ball bearings 122'. The airflow from the hybrid system 101' exits from air exit 134', which is directed toward the turbine 156. The exiting air will either re-enter the turbine engine or discharge into the atmosphere. As such, the airflow through the first and second channels 112a and 112b is in a direction opposite that of the third and fourth channels 112'a and 112'b.

FIGS. 4 and 5 are schematic representations illustrating the principles of operation. As discussed before, the first hybrid bearing 101 has an annular air-circuit sleeve 110 radially surrounding the lift cylinder 120 and the free-floating shaft 160, which is represented here as a rotating shaft 121. The sleeve 110 has a first set of channels 112a and a second set of channels 112b, forming air passageways 115a and 115b respectively between the sleeve 110 and the rotating shaft 121. The first set of channels 112a are formed in the generally upper portion 117a of the sleeve 110, and the second set of channels 112b are formed in the generally lower portion 117b of the sleeve 110. The first and second set of channels 112a and 112b receive compressed air from the compressors 124 and 128. The hybrid system 101 also comprises down-stream metering slots 114, wherein the metering slot 114 is configured to regulate the rate of airflow in the first and second set of channels 112a and 112b.

As shown in FIG. 5, each of the first set of channels 112a has a first cross sectional area 119a, and each of the second set of channels 112b has a second cross sectional area 119b, where the first cross sectional area 119a is less than the second cross sectional area 119b.

As a result of the differing cross sectional areas 119a and 119b, and metering slots 114 for the air passageways 115a and 115b, air entering the upper, first set of air passageways 115a, will traverse the air passageway 115a at a higher velocity $v_U$ than the velocity $v_L$ of the air traversing through the lower, second set of air passageways 115b.

Following aerodynamics principle, an increase in the speed of the air occurs simultaneously with a decrease in pressure. As such, the pressure of the air in the upper, first passageways 115a, $P_u$, will be less than that of the pressure $P_L$ of the lower, second set of air passageways 115b. This air pressure differential, combined with the effective, exposed surface area of the rotating shaft 121 determines the lifting force $F_L$ applied to the rotating shaft 121. The length of the air-circuit sleeve 110 is designed based on lift surface area needed for weightless rotor 121 rotation. As a result, metal contact is removed between the rolling element and raceways of the ball bearings 122 such that the need for lubricants and complicated lubrication systems are eliminated.

Figure 6:
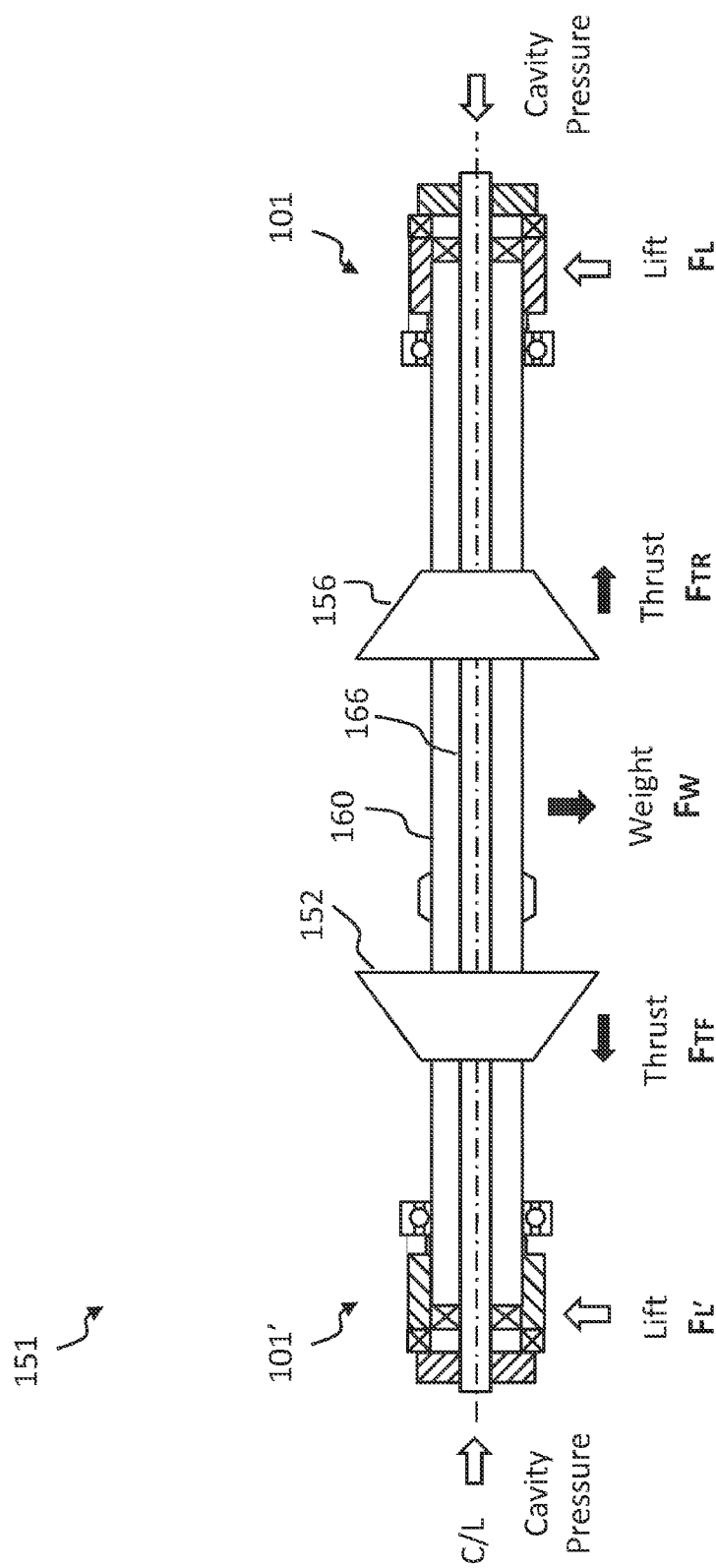
FIG. 6 is a schematic diagram of a rotor assembly showing forces of weight, thrust, and lift.

FIG. 6 is a representation of the turbine engine 151 illustrating the forces acting upon the free-floating shaft 160. The weight of the components affixed to the free-floating shaft $F_W$ comprises the individual weights for the engine compressor 152, the turbine 156, the free-floating shaft 160, the rotor shaft 166, the axial compressors 124 and 124', the radial compressor 128 and 128', the ball bearings 122 and 122', the lift cylinders 120 and 120', and the tie-shaft nuts 126 and 126'. The lifting force of the hybrid bearing system 101 is given by $F_L$, and the lifting force for the hybrid bearing system 101' is given by $F_{L'}$. In one or more embodiments, the total lifting forces $F_L$ and $F_{L'}$ required to overcome the weight $F_W$ may be tailored by the design of the air passageways 115a and 115b, including the cross sectional areas 119a and 119b, the length of the sleeve 110, and the metering slots 114 an 114'. The forward thrust is given by $F_{TF}$, and the reverse thrust force is given by $F_{TR}$. The thrust for engine compressors and turbines are varied with turbine engine design. FIG. 6 depicts the forces at play for a turbine engine having a horizontal free-floating shaft.

Figure 7:
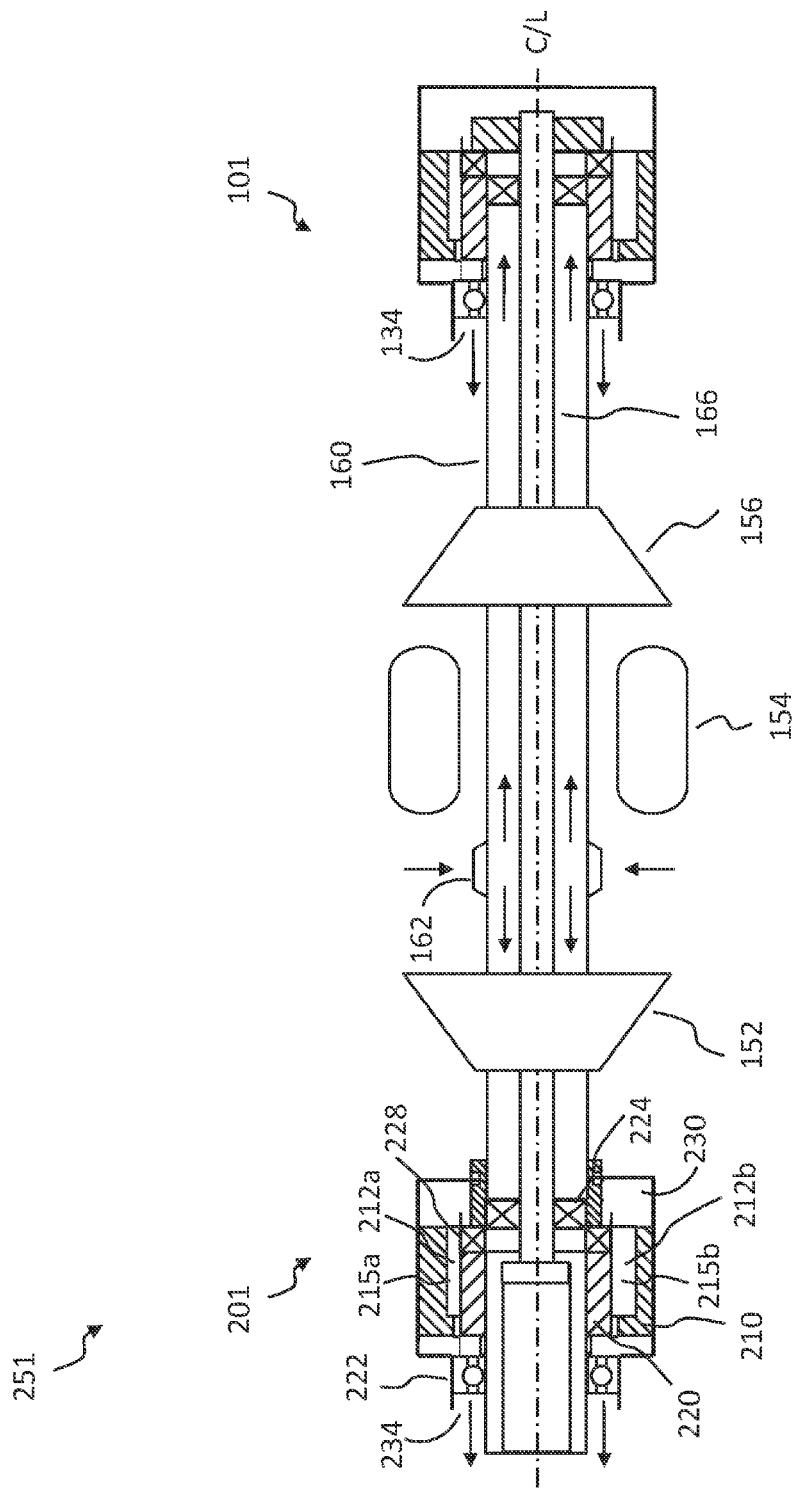
FIG. 7 is schematic diagram of a horizontal turbine engine having an air bearing system in an embodiment.

FIG. 7 is a schematic diagram of a turbine engine 251 having hybrid bearing systems 101 and 201 in an embodiment. The turbine engine 251 comprises a first hybrid bearing system 101, a second hybrid bearing system 201, an engine compressor 152, a combustor 154, and a turbine 156. The turbine engine 151 has a rotating shaft centered around a generally horizontal centerline $C_L$. The rotating shaft comprises a hollow free-floating shaft 160 and an inner rotor shaft 166 in one or more embodiments. The free-floating shaft 160 and the rotor shaft 166 rotate around a center line $C_L$ and connect the first hybrid bearing system 101, the turbine 156, the engine compressor 152, and the second hybrid bearing system 201.

Details of hybrid system 101 are discussed above. For hybrid system 201, the air enters the axial compressor 224, is then injected into radial compressor 228 and enters a thrust management cavity 230. The thrust management cavity 230 receives the compressed air from the compressors 224 and 228 and provides the compressed air to the third and fourth of channels 212a and 212b in the sleeve 210 radially surrounding a lift cylinder 220, where the thrust management cavity 230 is configured to reduce thrust load based on cavity air pressure and shaft-end surface area. Compressed air then flows though air passageways 215a and 215b, and then flows to ball bearings 222. The airflow from the hybrid system 201 exits from air exit 234 and is directed away from the turbine 156. The exiting air will either re-enter the turbine engine or discharge into the atmosphere. As such, the airflow through the first and second channels 112a and 112b is in the same as that of the third and fourth channels 212a and 212b.

Figure 8:
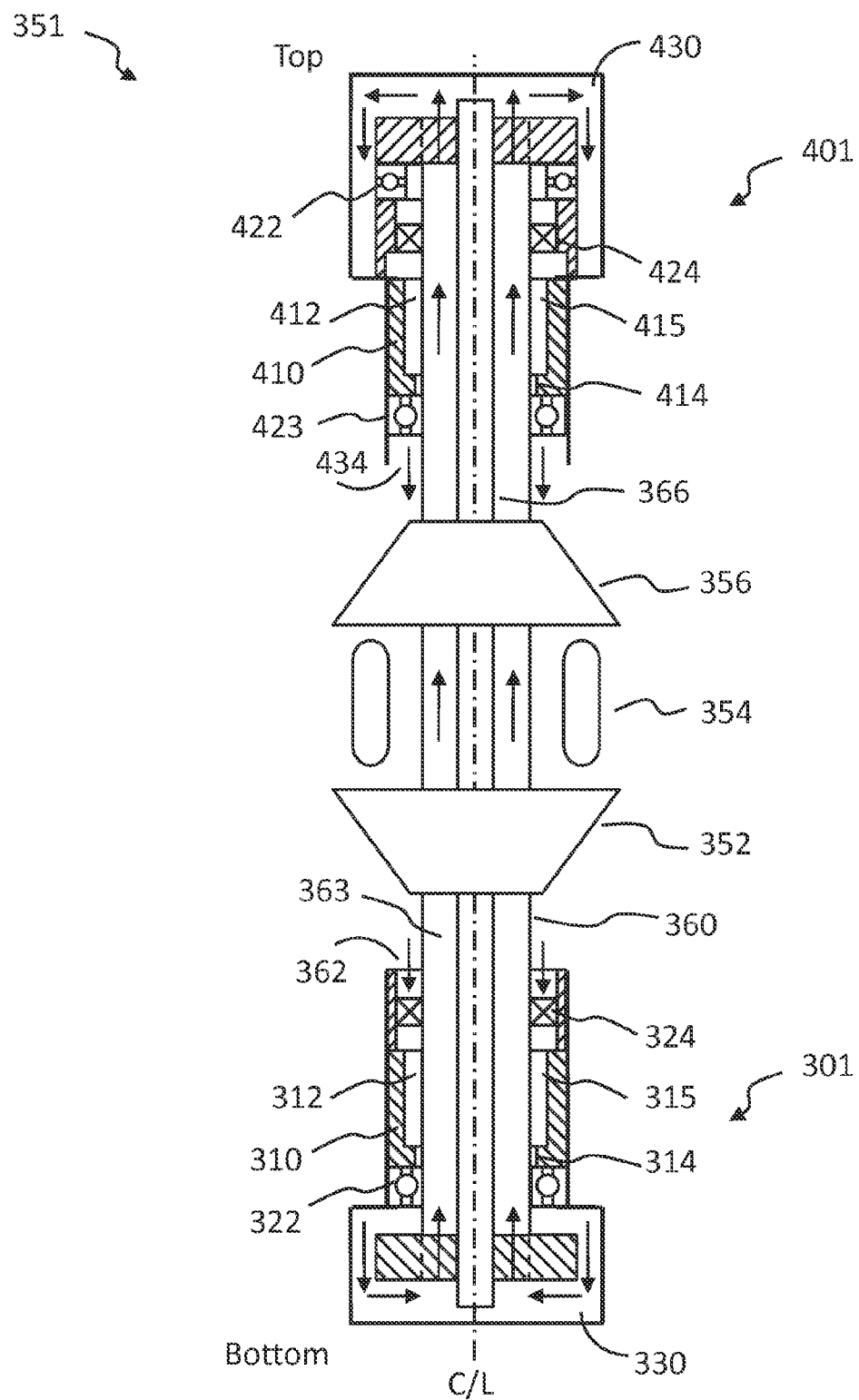
FIG. 8 is a schematic diagram of a vertical turbine engine in an embodiment.

FIG. 8 is schematic diagram of a vertical turbine engine 351 having hybrid bearing systems 301 and 401 in an embodiment. The turbine engine 351 comprises a first hybrid bearing system 301, a second hybrid bearing system 401, an engine compressor 352, a combustor 354, and a turbine 356. The turbine engine 351 has a rotating shaft centered around a generally vertical centerline. The rotating shaft comprises a hollow free-floating shaft 360 and an inner rotor shaft 366 in one or more embodiments. The free-floating shaft and the rotor shaft rotate around a center line $C_L$ and connect the first hybrid bearing system 301, the turbine 356, the engine compressor 352, and the second hybrid bearing system 401. Hybrid systems 301 and 401 each comprises a bearing system having a compressor coupled to the rotating shaft, the compressor supplying compressed air, and an annular sleeve radially surrounding the rotating shaft, the sleeve having channels formed on the inner surface of the sleeve, each channel forming an air passageway between the sleeve and the rotating shaft, the channels receiving compressed air from the compressor. In one or more embodiments, the channels for each hybrid system are equivalent and do not provide a net force laterally.

Specifically, for hybrid system 301, the air enters through air inlet 362 and enters a compressor 324, and provides the compressed air to the channels 312 in the sleeve 310. Compressed air then flows though air passageways 315, and then flows to ball bearings 322. In one or more embodiments, the channels 312 and slots 314 forming the air passageways 315 are equivalent and do not provide a net force laterally.

The ball bearings 322 are configured to receive the compressed air for cooling the ball bearings 322. In one or more embodiments, the turbine engine 351 does not employ a lubrication system for the ball bearings 322. The airflow from the hybrid system 301 exits through a thrust management cavity 330 and the cavity 363 and is directed to hybrid bearing system 401 at the top. Cavity 363 is formed between the hollow, free-floating shaft 360 and the rotator shaft 366.

For hybrid system 401, the air enters cavity 430 and is directed through a thrust ball bearing 422, and is injected into compressor 424. Compressed air then flows though the channels 412 and slots 414 in a sleeve 410 forming passageways 415, and then to ball bearings 423. In one or more embodiments, the channels 412 and slots 414 forming the air passageways 415 are equivalent and do not provide a net force laterally. The airflow from the hybrid system 401 exits from air exit 434 and is directed toward the turbine 356. The exiting air will either re-enter the turbine engine or discharge into the atmosphere. In one or more embodiments, the turbine engine 351 does not employ a lubrication system for the ball bearings 422 and 423.

Although the invention has been discussed with reference to specific embodiments, it is apparent and should be understood that the concept can be otherwise embodied to achieve the advantages discussed. The preferred embodiments above have been described primarily as hybrid bearings having both air bearings and ball/roller bearings for gas turbines. In this regard, the foregoing description of the hybrid bearings is presented for purposes of illustration and description. It shall be apparent that various gas turbine engines may also benefit from the hybrid bearings described herein.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A bearing system comprising:
a shaft centered around a horizontal centerline;
a compressor coupled to the shaft, the compressor supplying compressed air; and
an annular sleeve radially surrounding the shaft, the sleeve having a first and a second set of channels formed on an inner surface of the sleeve, each channel forming an air passageway between the sleeve and the shaft, the first set of channels formed in the upper portion of the sleeve, the second set of channels formed in the lower portion of the sleeve, the first and second set of channels receiving compressed air from the compressor,
wherein the first and second set of channels are configured to generate a lifting force on the shaft in a upward direction during operation, and
wherein each of the first set of channels has a first cross sectional area, and each of the second set of channels has a second cross sectional area, wherein the first cross sectional area is less than the second cross sectional area.

2. The bearing system of claim 1, wherein each of the first and second set of channels further comprise a down-stream metering slot, wherein the metering slot is configured to regulate the rate of airflow in the first and second set of channels.

3. The bearing system of claim 1, further comprising one or more ball bearings coupled to the shaft, wherein the ball bearings are configured for providing support for the shaft.

4. The bearing system of claim 3, wherein the ball bearings are configured to receive the compressed air for cooling the ball bearings.

5. The bearing system of claim 3, wherein the bearing system does not employ a lubrication system for the ball bearings.

6. The bearing system of claim 1, further comprising a thrust management cavity receiving the compressed air from the compressor and providing the compressed air to the first and second set of channels in the sleeve, wherein the thrust management cavities are configured to reduce thrust load based on cavity air pressure and shaft-end surface area.

7. The bearing system of claim 1, where said compressor is a first compressor coupled to a first end of the rotating shaft, said system further comprising:
a second compressor coupled to a second end of the rotating shaft, the second compressor supplying a second source of compressed air;
a second annular sleeve radially surrounding the shaft, the second sleeve having a third and a fourth set of channels formed on an inner surface of the second sleeve, each channel forming an air passageway between the second sleeve and the shaft, the third set of channels formed in an upper portion of the second sleeve, the fourth set of channels formed in a lower portion of the second sleeve, the third and fourth set of channels receiving the second source of compressed air from the second compressor,
wherein the airflow through the first and second channels is in a direction opposite that of the third and fourth set of channels.

8. The bearing system of claim 1, where said compressor is a first compressor coupled to a first end of the rotating shaft, said system further comprising:
a second compressor coupled to a second end of the rotating shaft, the second compressor supplying a second source of compressed air;
a second annular sleeve radially surrounding the shaft, the second sleeve having a third and a fourth set of channels formed on an inner surface of the second sleeve, each channel forming an air passageway between the second sleeve and the shaft, the third set of channels formed in the upper portion of the second sleeve, the fourth set of channels formed in the lower portion of the sleeve, the third and fourth set of channels receiving the second source of compressed air from the second compressor,
wherein the airflow through the first and second set of channels is in a same direction as that of the third and fourth set of channels.

9. A bearing system comprising:
a shaft centered around a vertical centerline;
a compressor coupled to the shaft, the compressor supplying compressed air;
an annular sleeve radially surrounding the shaft, the sleeve having channels formed on an inner surface of the sleeve, each channel forming an air passageway between the sleeve and the shaft, the channels receiving compressed air from the compressor; and
a thrust management cavity receiving the compressed air from the compressor and providing the compressed air to the channels in the sleeve, wherein the thrust management cavities are configured to reduce thrust load based on cavity air pressure and shaft-end surface area.

10. The bearing system of claim 9, wherein each of the channels further comprises a down-stream metering slot, wherein the metering slot is configured to regulate the rate of airflow in the channels.

11. The bearing system of claim 9, further comprising one or more ball bearings coupled to the shaft, wherein the ball bearings are configured for providing support for the shaft.

12. The bearing system of claim 11, wherein the ball bearings are configured to receive the compressed air for cooling the ball bearings.

13. The bearing system of claim 11, wherein the system does not employ a lubrication system for the ball bearings.

14. The bearing system of claim 9, further comprising:
a second compressor coupled to a second end of the rotating shaft, the second compressor supplying a second source of compressed air;
a second annular sleeve radially surrounding the shaft, the second sleeve having a second set of channels formed on an inner surface of the second sleeve, each channel forming an air passageway between the second sleeve and the shaft, the second set of channels receiving the second source of compressed air from the second compressor,
wherein an airflow through the first set of channels is in the same direction as an airflow through the second set of channels.

15. A bearing system comprising:
a shaft centered around a horizontal centerline;
a first hybrid bearing system comprising:
a first compressor coupled to the shaft, the compressor supplying compressed air;
a first annular sleeve radially surrounding the shaft, the first sleeve having a first and a second set of channels formed on an inner surface of the first sleeve, each channel forming an air passageway between the first sleeve and the shaft, the first set of channels formed in an upper portion of the first sleeve, the second set of channels formed in a lower portion of the first sleeve, the first and second set of channels receiving compressed air from the compressor, a first set of one or more ball bearings coupled to the shaft, wherein the ball bearings are configured for providing support for the shaft wherein the first and second set of channels are configured to generate a lifting force on the shaft in a upward direction;

a second hybrid bearing system comprising:

a second compressor coupled to the opposite end of the rotating shaft, the second compressor supplying a second source of compressed air;

a second annular sleeve radially surrounding the shaft, the second sleeve having a third and a fourth set of channels formed on an inner surface of the second sleeve, each channel forming an air passageway between the second sleeve and the shaft, the third set of channels formed in an upper portion of the second sleeve, the fourth set of channels formed in the a lower portion of the second sleeve, the third and fourth set of channels receiving the second source of compressed air from the second compressor, a second set of one or more ball bearings coupled to the shaft, wherein the ball bearings are configured for providing support for the shaft, an engine compressor; and, a turbine.

16. The bearing system of claim 15, wherein the compressor is optional if the compressed air are supplied by an engine compressor.

17. The bearing system of claim 15, wherein an airflow through the first and second channels is in a direction opposite that of the third and fourth channels.

18. The bearing system of claim 15, wherein an airflow through the first and second channels is in a same direction as that of the third and fourth channels.

* * * * *